United States Patent
Villatel et al.

(10) Patent No.: US 9,633,231 B2
(45) Date of Patent: Apr. 25, 2017

(54) HARDWARE-PROTECTIVE DATA PROCESSING SYSTEMS AND METHODS USING AN APPLICATION EXECUTING IN A SECURE DOMAIN

(71) Applicant: HEWLETT-PACKARD DEVELOPMENT COMPANY, L.P., Houston, TX (US)

(72) Inventors: Maugan Villatel, Bristol (GB); Boris Balacheff, Les Ulis (FR); Chris I Dalton, Bristol (GB); David Plaquin, Bristol (GB); Adrian Shaw, Bristol (GB); Simon Kai-Ying Shiu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 55 days.

(21) Appl. No.: 14/754,898

(22) Filed: Jun. 30, 2015

(65) Prior Publication Data

US 2016/0125201 A1    May 5, 2016

(30) Foreign Application Priority Data

Oct. 31, 2014   (FR) ..................................... 1460522

(51) Int. Cl.
*G06F 21/62* (2013.01)
*G06F 21/74* (2013.01)
(Continued)

(52) U.S. Cl.
CPC ............... *G06F 21/74* (2013.01); *G06F 9/46* (2013.01); *G06F 21/53* (2013.01); *G06F 21/62* (2013.01);
(Continued)

(58) Field of Classification Search
USPC .......................................................... 726/30
See application file for complete search history.

(56) References Cited

U.S. PATENT DOCUMENTS

| 8,725,123 B2 | 5/2014 | Raleigh et al. |
| 2007/0226795 A1 | 9/2007 | Conti et al. |

(Continued)

OTHER PUBLICATIONS

Muthu, A., Emulating Trust Zone Feature in Android Emulator by Extending QEMU, IV 203X-Degree Project, <http://www.diva-portal.org/smash/get/diva2:647792/FULLTEXT02 >, May 24, 2013, 64 pages.

(Continued)

*Primary Examiner* — Jeffrey Pwu
*Assistant Examiner* — Samuel Ambaye
(74) *Attorney, Agent, or Firm* — HP Patent Department

(57) ABSTRACT

A data processing system supporting a secure domain and a non-secure domain comprises a hardware component, and a processor device having operating modes in the secure domain and non-secure domain, the processor device to execute a secure application in the secure domain. The hardware component has a property having a secure state. The property of the hardware component in the secure state may only be reconfigured responsive to instructions received from the secure domain. The secure application is operative to implement a configuration service to configure the property of the hardware component in the secure state, responsive to a request received from the non-secure domain according to an application programming interface associated with the secure application.

10 Claims, 5 Drawing Sheets

(51) Int. Cl.
  *G06F 21/53* (2013.01)
  *G06F 9/46* (2006.01)
  *G06F 17/30* (2006.01)

(52) U.S. Cl.
  CPC ............ *G06F 21/629* (2013.01); *G06F 17/30* (2013.01); *G06F 21/6281* (2013.01)

(56) References Cited

U.S. PATENT DOCUMENTS

| | | | |
|---|---|---|---|
| 2012/0297043 A1* | 11/2012 | Davis | H04L 45/60 709/223 |
| 2013/0318358 A1 | 11/2013 | Wang et al. | |
| 2014/0122820 A1* | 5/2014 | Park | G06F 12/145 711/163 |
| 2014/0165216 A1* | 6/2014 | Kwag | G06F 21/629 726/30 |

OTHER PUBLICATIONS

Unknown, Tee and Arm TrustZone, Retrieved from the Internet: <http://www.liwenhaosuper.com/blog/2014/05/26/tee-and-arm-trustzone/> [retrieved on May 26, 2015], 9 pages.

* cited by examiner

HARDWARE-PROTECTIVE DATA PROCESSING SYSTEMS AND METHODS USING AN APPLICATION EXECUTING IN A SECURE DOMAIN

BACKGROUND

The present disclosure relates to data processing systems and methods that provide security for hardware components.

There are many different types of data processing systems, including general-purpose apparatuses and embedded systems: for example mobile phones, tablets, PCs, enterprise computing systems, processing nodes in data centers, and so on. Data processing systems typically comprise a processor device and a variety of hardware components, for example data-storage devices, memory controllers, network interface controllers, interrupt controllers, graphics accelerators, cryptographic accelerators, and so on.

DETAILED DESCRIPTION

Figure 1:
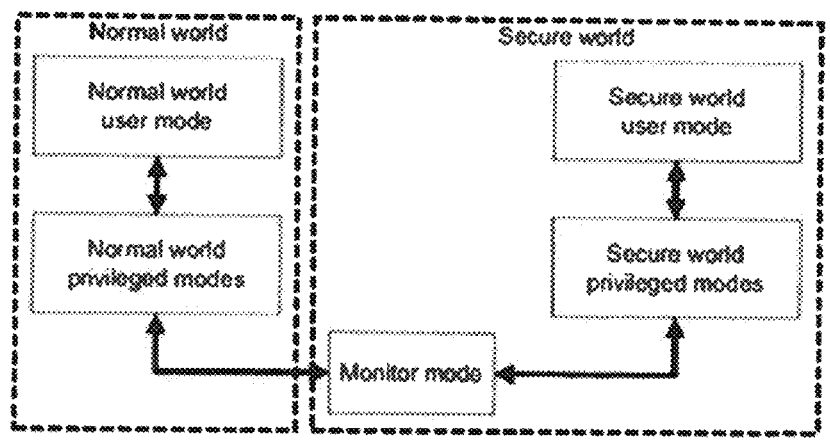
FIG. 1 is a diagram illustrating operating modes of a processing device in a data processing system according to an example of the present disclosure, in which parallel secure and non-secure domains are supported.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

In some cases it is important, for security reasons, to restrict software applications (and other hardware components) that are able to modify the configuration of a particular hardware component in a data processing system. More particularly, certain properties of a hardware component may be sensitive from a security standpoint, and measures may be put in place to restrict the software and devices that may set or change these security-sensitive properties. When such measures are in place it may be considered that the relevant properties of the hardware component are "secure".

In the present document the expressions "configure" or "reconfigure" will be used to designate the process of setting or changing a secure property of a hardware component.

Certain processor devices have among their operating modes a system management mode (SMM mode). For example, SMM mode is available in Intel Corp.'s x86 family of CPUs from 386SL onward. SMM mode is a highly-privileged operating mode entered via an SMI interrupt which causes program execution to pass to a handler in a secure memory area (SMRAM) that is inaccessible to the operating system and to application software or general-purpose system software. The memory location of the handler is designated by firmware during system boot.

In data processing systems having an x86 family architecture sometimes a hardware component may have a secure property that may only be set or changed when the processor is operating in SMM mode. In other words, the configuration of the secure property is an activity reserved to privileged software, thereby improving security. Software that lacks the appropriate level of privilege (i.e. that is not executed in SMM mode) may not configure the relevant property of the system hardware. Thus, in these types of data processing systems untrusted software may not make potentially harmful changes to the secure properties of protected hardware.

However, in data processing systems whose processor devices support SMM mode there are significant "costs" involved in using SMM mode. Responsive to the processor device switching to SMM mode, all normal execution is suspended, including the operating system, with the result that functions and tasks are delayed. This is a particular problem for real-time applications that involve tight timing constraints. Moreover, in an example in which the processor device is a multicore processor, this "cost" in terms of increased delay is magnified because an interrupt that triggers a switch to SMM mode causes all the cores to switch modes. Also, the mode switching to and from SMM mode involves an overhead because it is necessary to save data defining all the context of the current task (e.g. the CPU state) to memory and subsequently to restore the context when switching back out of SMM mode.

Examples of the present disclosure use a different approach to achieve the function of securing properties of hardware components in data processing systems against undesired changes to their configuration.

Examples of certain data processing systems and methods according to the present disclosure which provide security to properties of their hardware components will be described below and a specific example application will be described in the context of providing security to a cryptographic hardware accelerator. However, this example application is described purely for the purposes of illustration; the present disclosure extends also to data processing systems and methods which provide security to hardware components other than cryptographic hardware accelerators.

An example data processing system according to the present disclosure implements a security framework that supports a secure domain and a non-secure domain (also referred to as a Secure World and a Normal World). According to this first example data processing system the secure and non-secure domains are supported by a single processor operating in a time division manner to implement two virtual cores, one for the secure domain and the other for the normal domain. However, it is also possible to use separate physical processor cores to execute data processing for the secure and non-secure domains. The first example data processing system will be described below according to an architecture that implements a security framework of the TrustZone® type proposed by ARM Limited. While the TrustZone® security framework is described in this example, other feasible frameworks may be used as well. As such, the use of the term TrustZone® throughout this disclosure is not intended to be limiting, but is merely used as an example feasible framework.

In each domain the processing device may have plural operating modes that have different levels of privilege, such as a high-privilege kernel mode and relatively lower privilege user modes. The secure and non-secure domains do not necessarily support the same types of operating mode as each other. The secure domain processor core also may operate in a monitor mode which handles switching between operating modes in the secure domain and operating modes in the non-secure domain.

FIG. 1 illustrates operating modes that are supported in the example data processing system according to the present disclosure. FIG. 1 shows the operating modes that are supported in the non-secure and secure domains. In effect a secure world is available in parallel to the non-secure world so that trusted applications and data may be isolated from non-trusted applications and data. This isolation technique was originally developed for mobile platforms—e.g. phones, tablets, and so on—in view of the growing tendency for users of mobile platforms to download applications and content having different (and sometimes unknown) degrees of trustworthiness. The existence of the secure and non-secure domains provides an isolation technique that is orthogonal to the hierarchy of privilege that is provided by having different operating modes.

In examples in which TrustZone® technology is employed, the parallel secure and non-secure domains are supported by virtue of various elements, including special bus fabric, and a monitor mechanism for switching between domains. There are also security extensions which mean that components are aware of the domain applicable to a transaction and are adapted to behave appropriately to the security level of the applicable domain.

In the present example data processing system in which parallel secure and non-secure domains are supported, hardware components that are assigned to the secure domain may reject request which would access secure assets/resources when the requests come from the non-secure domain.

In this example system implementing TrustZone®, certain hardware components are useable by elements in the non-secure and secure domains. The hardware components of this type have security extensions that may ensure that their security-sensitive properties may only be configured or reconfigured by secure world elements. The nature of the security extension that is appropriate for securing a particular property of a hardware component may be dependent on the nature of the hardware component. For instance, the hardware component may be associated with a controller which handles the setting/changing of the hardware component's secure properties, and this controller may determine whether a received instruction comes from the secure/non-secure domain.

In an example in which a transaction takes place in this example system implementing TrustZone®, for example when a software application sends a data read request to a memory or other device in the system via an interconnect/bus, a control bit on the bus indicates whether this transaction is issued by a device in the non-secure domain or in the secure domain. Thus, the memory (or an associated memory controller) is informed about whether or not the transaction is in the secure domain and may take this into account to decide whether or not it is appropriate to proceed with satisfying the request. An example of an interconnect that offers the above functionality is an Advanced Extensible Interface (AXI bus) according to the AMBA® (Advanced Microcontroller Bus Architecture) specification, proposed by ARM Limited.

Hardware components that have native TrustZone® support have the capability to read the control bit propagating on the interconnect and so they are aware of the secure/non-secure domain in which each transaction is taking place. Furthermore, such components output bits which indicate whether they themselves are operating in the secure or non-secure domain.

There are different ways in which hardware components that do not have native TrustZone® support may be assigned on a permanent or temporary basis to the secure domain or the non-secure domain. The hardware component may connected to an AXI or ACE bus (AXI Coherency Extensions bus) and be used in association with a TrustZone Address Space Controller or TrustZone® Memory Adapter. Alternatively, a bridge may be provided between the interconnect/bus which propagates the control bit signalling the secure/non-secure domain and a bus to which the hardware components are connected. For example, an AXI to APB bus may be used to connect an AXI interconnect to an AMBA® Advanced Peripheral Bus (APB) to which certain hardware components are connected. The AXI to APB bridge has control inputs indicating the assignment of the hardware components to the secure/non-secure domain. The control inputs may be fixed or they may be dynamically controlled, for example by a module such as a TrustZone Protection Controller. As another example, an AXI to AHB bus may be used to connect an AXI interconnect to an AMBA® Advanced High-Performance Bus (AHB) to which certain hardware components are connected (in which case all the hardware components connected to the relevant AHB bus share the same assignment to the secure or non-secure domain). Other feasible implementations may be used as well.

Figure 2A:
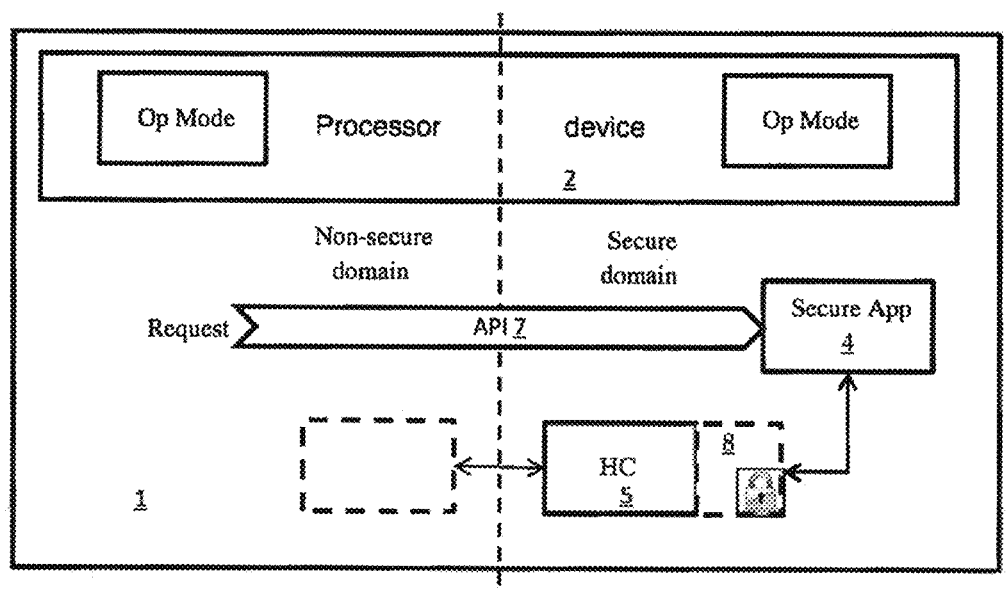
FIG. 2A is a block diagram illustrating a hardware architecture that may be used in a data processing system according to an example of the present disclosure, in which parallel secure and non-secure domains are supported.

FIG. 2A illustrates a data processing system 1 according to an example of the present disclosure. The data processing system 1 supports a secure domain and a non-secure domain and comprises a processor device 2 having operating modes in the secure domain and non-secure domain (i.e. at least one operating mode in the non-secure domain and at least one operating mode in the secure domain). The processor device 2 of the data processing system 1 may execute a secure application 4 in the secure domain to protect the security of a hardware component 5. The hardware component 5 has a property 8 which has a secure state (i.e. either the property 8 is permanently secure or it may be rendered secure temporarily). In an example in which the property 8 is in the "secure" state, that property 8 may only be configured responsive to instructions received from the secure domain.

The secure application 4 comprises program code which, when executed, offers a configuration service enabling a property 8 of the hardware component 5 to be configured even though that property 8 is in the secure state. Devices and applications from the non-secure domain may send requests to the secure application 4 via an application programming interface (API) 7 associated with the secure application. Responsive to the secure application 4 deeming the request to be appropriate, the secure application implements the necessary setting/changing of the secure property 8 of the hardware component 5. The secure application may implement any convenient security policy to decide whether or not a given request is appropriate.

In this example the secure application 4 is stored in secure memory within the data processing system 1 and it may, for example, be provided as system firmware.

Figure 2B:
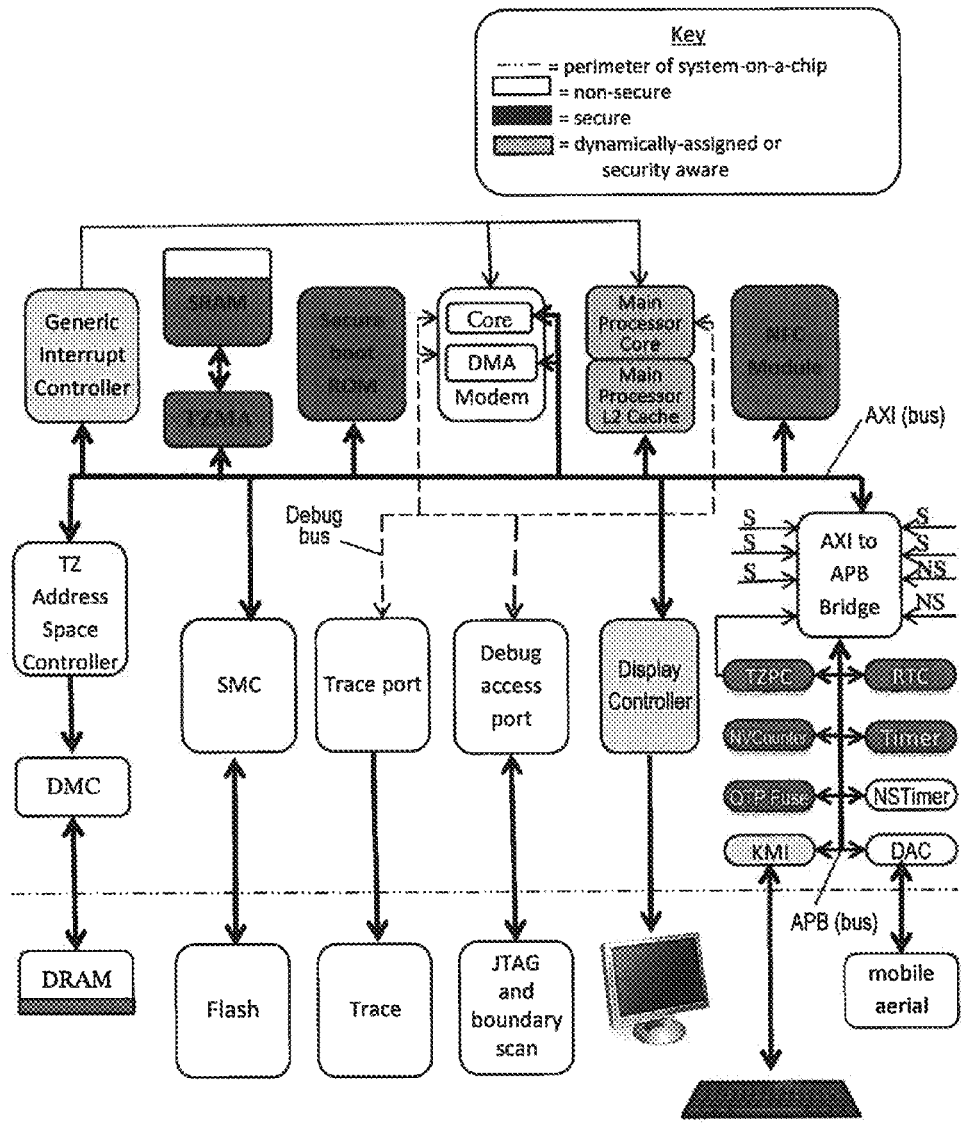
FIG. 2B is a block diagram illustrating an example hardware architecture that may be used to implement the architecture of FIG. 2A.

FIG. 2B illustrates a hardware architecture that may be used to implement the system of FIG. 2A using TrustZone® technology. In this example hardware architecture, a number of components are provided on an SoC (system on a chip); the perimeter of the SoC is indicated by dashed lines in the figure. Components illustrated using white boxes are assigned to the non-secure domain, components illustrated using dark grey boxes are assigned to the secure domain and components illustrated using light grey boxes may be dynamically assigned to the secure or non-secure domains or are security aware (that is, depending on the secure or non-secure domain applicable to a transaction their behaviour will be different).

The example hardware architecture illustrated in FIG. 2B has an AXI bus, an APB bus and an AXI to APB bridge. FIG. 2B shows the control inputs to the AXI to APB bridge which notify the bridge of which domain (non-secure or secure) is assigned to each of the peripherals attached to the APB bridge. In FIG. 2B the spatial layout of the control inputs to the AXI to APB bridge matches the spatial layout of the peripherals attached to the APB bus as shown in the figure (e.g. the bottom right control input NS indicates the domain assigned to the digital to analogue convertor DAC shown at the bottom right of FIG. 2B). The keyboard management interface KMI may be dynamically assigned to the secure or non-secure mode by the TrustZone Protection Controller shown in FIG. 2B just below the AXI to APB bridge.

Figure 3:
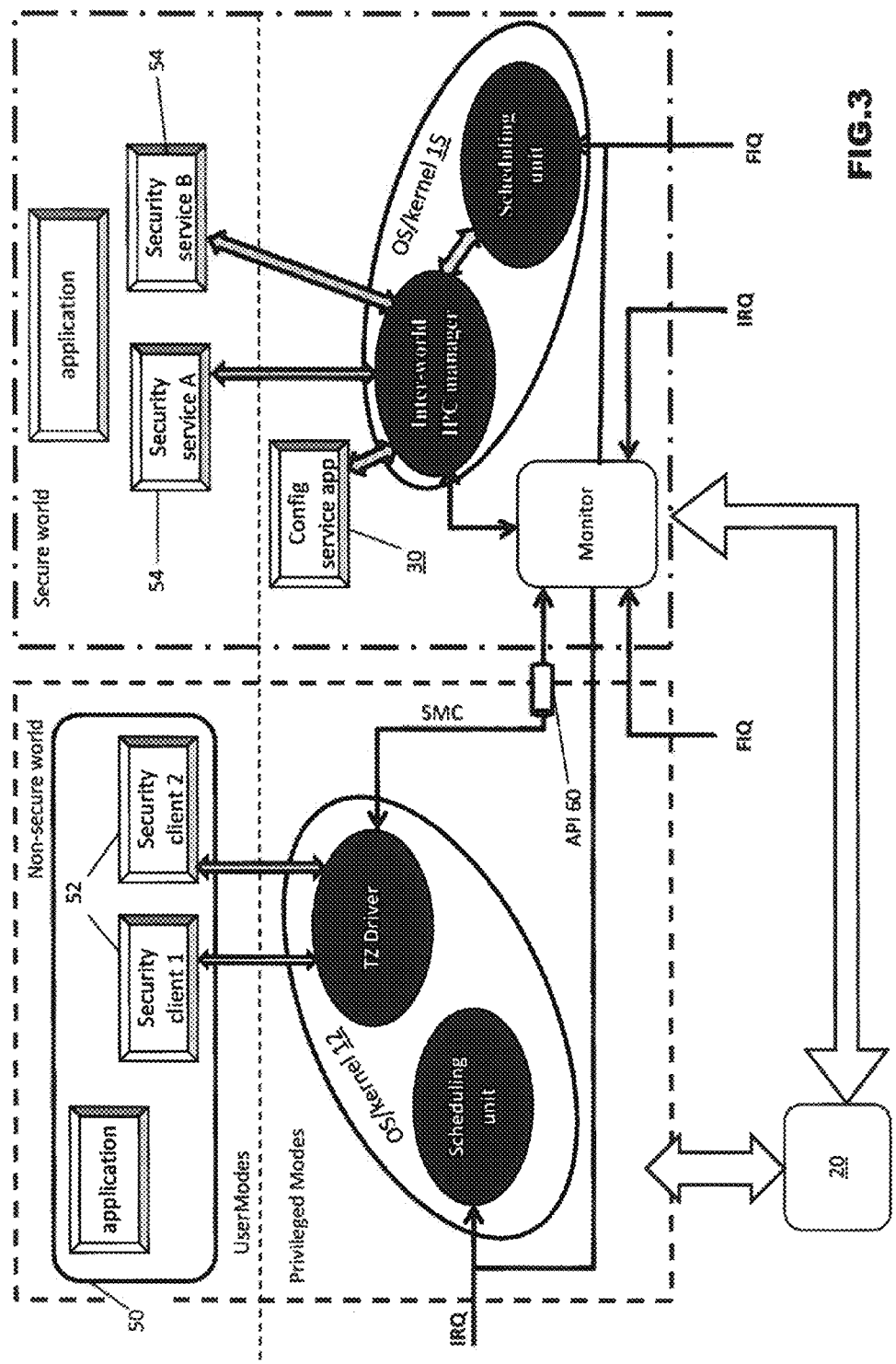
FIG. 3 illustrates the software architecture of a data processing system according to an example of the present disclosure, in which parallel secure and non-secure domains are supported.

FIG. 3 illustrates a software architecture that may be used in an example data processing system according to the present disclosure, with diagrammatic representation of some associated hardware components.

FIG. 3 shows various user operating modes and privileged operating modes in the non-secure and secure domains, and shows interrupts (IRQ), fast interrupts (FIQ) and System Monitor calls (SMC) that relate to switching between the secure and non-secure domains. As can be seen, in the example illustrated in FIG. 3 there are various user-mode applications 50 that execute in the non-secure domain and a user-mode standalone application that executes in the secure domain. Furthermore, there may be an operating system (kernel) 12 for the non-secure domain and a separate secure operating system 15 for the secure domain. It is not mandatory for the secure domain of the example data processing system according to the present disclosure to have its own secure operating system; various other approaches are possible including, at a simple level, having a synchronous library of code placed in the secure domain As illustrated in FIG. 3, the example data processing system may include some applications 52 in the non-secure world which are security clients, that is, they involve tasks that need to be performed by secure code in the secure domain. This may be the case, for example, when a content download software application resides in the non-secure domain but involves a secure payment process. In such a case, responsive to determining that a secure payment process is to be performed, the non-secure content-download application acts as a security client and requests an associated security service 54 in the secure domain to perform at least the sensitive tasks involved in the secure payment process.

As shown in FIG. 3, a secure configuration-service application 30 may be provided in the first example data processing system according to the present disclosure. The configuration-service application 30 is a trusted software application that executes in the secure domain. The configuration-service application 30 performs the service of modifying the configuration of secure properties of a number of hardware components 20 in the data processing system in response to requests from other applications or devices. The requests may comprise, for example requests from non-secure domain applications 50 or non-secure domain devices. The requests are transferred to the configuration-service application 30 by the non-secure domain operating system and its TrustZone® driver, in accordance with an API 60 associated with the configuration-service application 30. The API 60 of the configuration-service application 30 is typically built on top of the SMC Calling Convention proposed by ARM Limited, although other approaches may be used. Incidentally, the operating system of the non-secure domain may itself request the configuration-service application 30 to make changes in the configuration of a secure property of a protected hardware component.

The configuration-service application 30 may be used to provide security to selected hardware components 20 in the system. A number of other hardware components in the data processing system may be unsecured by the configuration-service application 30.

The configuration-service application 30 may be arranged to provide security for a number of hardware component properties that are permanently in a secure state (i.e. permanently in the state where they are only capable of being configured by the secure domain).

Alternatively or additionally, the configuration-service application 30 may be arranged to provide security for a number of hardware component properties which are not permanently secure. For example, it may be decided that it is appropriate to protect a particular property of a hardware component but the hardware component in question is not currently assigned to the secure domain. In such a case, the configuration-service application 30 may control the relevant hardware component to assign it to the secure domain such that it will not implement any instructions coming from the non-secure domain (thereby preventing response to a configuration instruction coming from the non-secure domain).

In the example discussed here, the dynamic assignment of a hardware component to the secure domain is performed using a TrustZone Protection Controller (TZPC) which appropriately sets the relevant control input to a bridge that connects to a bus on which hardware component communicates. The configuration-service application 30 may use the TZPC to assign a hardware component to the secure domain, thereby setting properties of the hardware component to the secure state. The configuration-service application 30 may use other methods as well to assign a hardware component to the secure domain, and is not limited to the examples described herein.

In an example data processing system according to the present disclosure, only the secure domain has the ability to change the configuration of properties of the hardware components 20 when those properties are in the secure state. In effect, while the selected properties of the hardware components are in the secure state, the function of making changes in the configuration of these selected properties is reserved to trusted code.

It may be that all code which executes in the secure domain is trusted code for the purposes of allowing access to configuration of secure properties of hardware components. For example, this may be the case if the configuration-service application 30 is the only secure application which executes in the secure domain. However, it may be the case that some other secure application executes in the secure domain but is not trusted for the purposes of configuring secure properties of hardware components. In such a case it is appropriate to reserve to trusted code the function of configuring the secure properties of hardware components.

This reservation may be implemented in different ways. In an example data processing system of the type illustrated in FIG. 3, the operating system 15 in the secure domain may implement a restricted operating system environment and any untrusted applications that execute in the secure domain may be sandboxed in the restricted operating system environment and thus made incapable of configuring secure properties of the hardware components 20. However the present disclosure is not limited to this approach; other approaches may be used to achieve the reservation.

In conventional data processing systems that implement a security framework using TrustZone® technology (i.e. using the TrustZone® bus fabric and security extensions) some hardware components may be permanently assigned either to the secure domain or to the non-secure domain. Other hardware components, e.g. peripherals such as a keyboard or display, may be assigned to the secure domain temporarily for just the time necessary for the implementation of a specific security function and then they may be released back to the non-secure domain when performance of the security function completes.

The data processing system according to the above-described example of the present disclosure enhances the security of selected properties of hardware components by making the function of configuring the selected properties of the hardware component(s), at times during which the selected properties is (are) in a secure state, a function that is reserved to trusted secure domain code (trusted secure domain applications). Moreover, in a case where the selected property is a property of a hardware component that is not permanently assigned to the secure domain, the configuration-service application 30 may be operative to assign the selected hardware component to the secure domain during a protection period whose start/end times and duration are determined based on factors that are discussed below and are not obligatorily linked to the period of execution of any particular security task.

Figure 4:
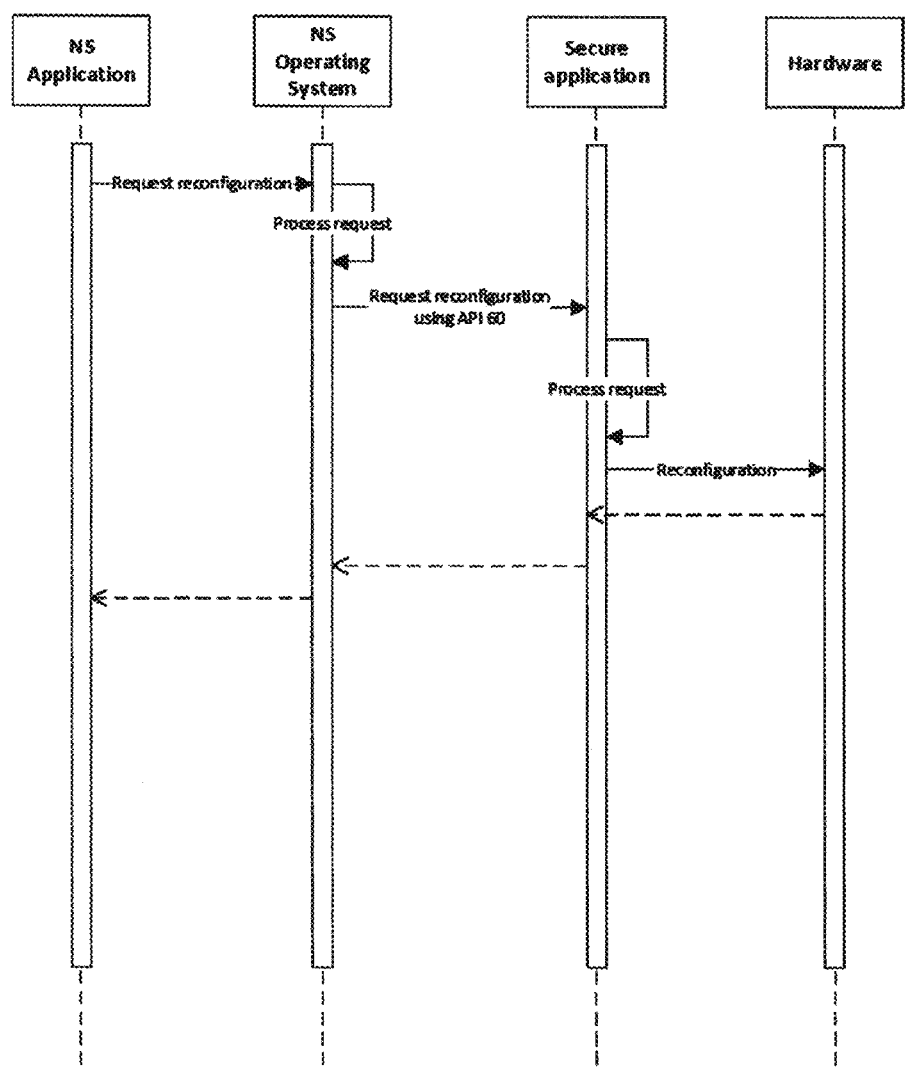
FIG. 4 is a diagram illustrating one example process for modifying the configuration of a secure property of a hardware component protected using an example of a data processing method according to the present disclosure.

FIG. 4 illustrates an example of a process for configuring a secure property of a hardware component, using the configuration-service application 30, at the request of an application executing in the non-secure world (called NS Application in FIG. 4).

As can be seen from the example illustrated in FIG. 4, an NS Application may make a request which, de facto, requires a change to be made in a secure property of a protected hardware component. The non-secure domain operating system (and, for example, its TrustZone® driver (s)) processes the request from the NS application and determines to send a request to the configuration-service application 30. The NS operating system may have built-in intelligence which allows it to determine that the request from the NS application involves configuration of a secure property of a hardware component, such that it may be necessary to make a request to the configuration-service application 30. However there are other possibilities. For example, the NS operating system may lack explicit knowledge that configuration of a protected property is required and may send a request to the configuration-service application 30 only after having tried (and failed) to satisfy the NS application's request.

The non-secure domain operating system (and its TrustZone® driver(s)) sends its request to the configuration-service application 30 via the monitor mode. The request is made in accordance with the API 60 associated with the configuration-service application and with the underlying communication channel with the Secure World (typically the SMC API). According to requirements, a single request from the NS application may entail a need for plural changes to be made to secure properties of a protected hardware component and/or for changes to be made to secure properties of plural protected hardware components.

The TrustZone® driver may be designed explicitly to implement the configuration service API. Another approach consists in designing the TrustZone® driver so that it may find out the configuration-service API (e.g. by making a special call to the secure domain for service discovery, via use of UEFI by the NS operating system, and so on).

An additional measure that may enhance security is for the API 60 to restrict the configuration options that are exposed to non-secure domain applications.

For example, a given hardware component may have a set of n properties whose values may be changed and each property may have a (continuous or discrete) range of possible values. The API 60 may be designed so that it allows the NS Application to request specified values for only some of the modifiable properties of the protected hardware component. Alternatively or additionally, the API 60 may be designed so that although it allows the NS Application to request specified values for any of the properties of the hardware component that are capable of being modified, the API 60 may only allow the NS Application to choose from a sub-set of the range of possible values that the properties may take (understanding that the sub-set may be freely chosen from among the full set of possible values, according to the designer's requirements).

Yet another approach comprises designing the API 60 so that the NS application formulates its request on the basis of an abstraction or model of the protected hardware component, without having knowledge of the specific property(ies) of the hardware component that may need to be changed in order to achieve a function or characteristic that the NS Application chooses based on the abstraction/model. Indeed the NS application may not even be aware of the specific hardware component(s) that will be involved in fulfilling its request. This approach provides advantages because it helps to avoid misconfigurations, and it may improve portability (e.g. in a case where there are two components providing the same functionality and requiring different configurations, the NS application would not be aware of any difference).

Thus the content of the request received at the secure application may be different depending on the implementation of the API 60. In one example, the NS operating system and its TrustZone® driver(s) send the configuration-service application 30 a request which indicates the function that the NS application wishes to perform (without explicitly identifying an associated change that is required in a secure property of a hardware component). In this case, the configuration-service application 30 determines that a change is required in a secure property of a hardware component and determines whether or not to perform the change. This determination may be made by application of a security policy. In another example, the NS operating system and its TrustZone® driver(s) send the configuration-service application 30 a request which identifies the change that is required in a secure property of a hardware component. In this case, the configuration-service application 30 simply makes the determination of whether or not to perform the change.

The present disclosure is not particularly limited having regard to the nature of the hardware components that may be protected, nor regarding the nature of the secure properties that may be protected. For the purposes of illustration only an example may be mentioned of a memory controller that provides access to different regions of associated memory. For security purposes, it may be important to control access to the different memory regions and so it may be appropriate to define as a secure property an address range specifying an accessible memory region. Using the techniques of the present disclosure, only trusted code may set/change the address range of this accessible memory region: if devices and applications from the non-secure domain need a change in the accessible memory region they need to contact the secure configuration-service application 30.

Another example, for the purposes of illustration only, concerns a cryptographic accelerator arranged to be useable by non-secure domain devices and applications. For security reasons, the cryptographic keys may need to be hidden from the non-secure domain. Accordingly, properties of the cryptographic accelerator which relate to key management are set as secure properties and the configuration-service application offers a key management service to the non-secure domain via the configuration-service API The choice of the number and nature of the hardware component properties to protect using the secure configuration-service application 30 may be made, for example, by the manufacturer of the data processing system, according to any convenient criteria. For the purposes of illustration only, an example may be given of the case of a data processing system constituting a processing node in a data center containing multiple processing nodes. If the specific configuration of a particular property of a hardware component in the data processing system has the potential to harm other nodes, this property may be selected for protection using the configuration-service application 30.

As illustrated in FIG. 4, the configuration-service application 30 processes the request received from the non-secure domain. Responsive to a determination that a required change in a secure property of a hardware component has to be made, the configuration service application 30 sends a configuration instruction to the hardware component. The hardware component determines that the configuration-service application 30 instructing the configuration of the secure property is executing in the secure domain and so implements the desired change in the secure property in accordance with the received instruction. The hardware component may then send a confirmation back to the secure configuration-service application 30. The confirmation may be propagated back to the NS Application.

As mentioned above, the configuration-service application 30 may be used in the protection of a property of a hardware component whose assignment to the secure domain and non-secure domain changes dynamically. In this case the configuration-service application 30 may determine to instruct the TrustZone Protection Controller TZPC to assign a selected hardware component to the secure domain at the start of a time period that may be designated a "protection period". At some time during the protection period, while the hardware component is still assigned to the secure domain, an application executing in the non-secure domain may send to the configuration-service application 30 a request that involves a change being made in a property of the protected hardware component, and the request is handled substantially in the same way as in the process of FIG. 4.

As mentioned above, the configuration-service application 30 is not obliged to set the start time and duration of the protection period to coincide with a time interval when the relevant hardware component is involved in performance of a security function. Indeed, even at a time when the host data processing system itself is not performing any function that is deemed to require high security, advantages may accrue from holding the hardware component in the secure domain and reserving to trusted code the function of configuring the hardware component's properties.

For example, it may occur that the data processing system starts to be used in an application or context that has not previously been envisaged. This new application/use context may involve a threat (i.e. to the security of a hardware component) that was unforeseen at design time and so the data processing system does not have an appropriate non-secure domain security client or secure-domain security service that will assign the hardware component to the secure domain while the apparatus is being used in the new application/context. However, in the case where the configuration-service application 30 operates to hold the hardware component in the secure domain and the function of configuring the hardware component's properties is reserved to trusted code, the hardware component is protected against the threat.

As another example, it may occur that the data processing system is connected to other systems of the same or different type. A change in a property of a hardware component in the first data processing system, which seems harmless in the context of the first data processing system (and, hence, is implemented in the non-secure domain), may have the potential to cause an undesirable result in a connected system. However, this problem may be solved in the case where the configuration-service application 30 operates to hold the hardware component in the secure domain and the function of configuring the hardware component's properties is reserved to trusted code, because the configuration-service application 30 may be designed to include code that controls which changes are permitted in the secure properties of the hardware components of the host data processing system in view of likely or possible impacts on connected systems/devices.

It will be understood from the preceding paragraph that the configuration-service application 30 may do more than simply execute changes in the secure properties of a protected hardware component at the request of non-secure domain applications. The secure configuration-service application 30 may apply criteria for deciding whether (and how) to implement the requested changes. The present disclosure is not particularly limited having regard to the nature of the criteria that may be taken into account nor having regard to the manner in which the secure application responds to a request as a function of the applied criteria.

The secure configuration-service application 30 may set the protection period for a selected hardware component according to a variety of different approaches, for example: set the protection period to extend over substantially the whole of the time that the data processing system is powered up, identify a context that may present a threat to the selected hardware component and set the protection period to coincide with times when the context is detected (or is predicted to occur) or, more generally, when it is determined that a threat condition exists: for example, set protection periods to coincide with times when a network interface controller is active to connect the data processing system to an external network, identify times at which changes in secure properties of the hardware component are capable of causing harm or damage to other elements (e.g. components in external devices connected to the data processing system) and set protection periods to coincide with the identified times, and so on.

Figure 5A:
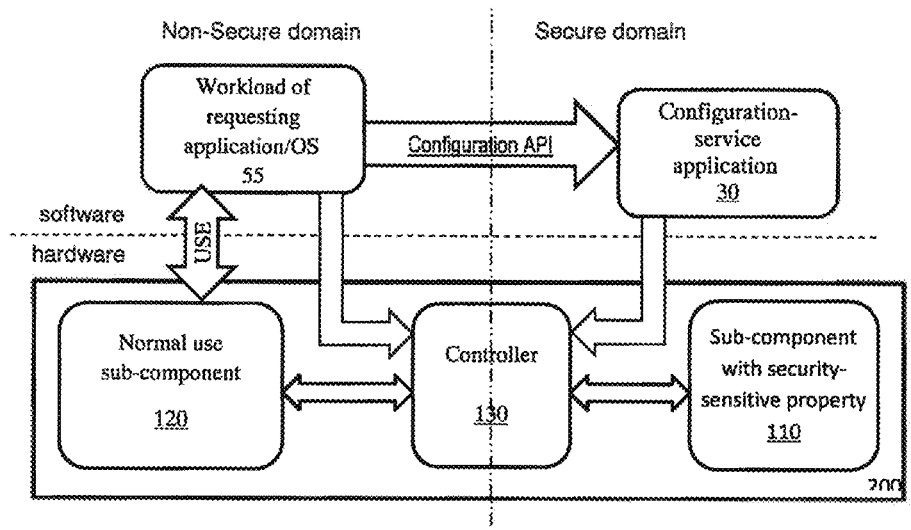
FIG. 5A is a diagram illustrating an example of transactions between components in a data processing system during an example process of making a change in the configuration of a hardware component.

In some examples of data processing system according to the present disclosure the protected hardware components are arranged so as to separate their sub-components which have properties that are sensitive from a security standpoint from their sub-components which do not have security-sensitive properties. The separation may be achieved in any convenient manner. A hardware component of this type may comprise a controller associated with the security-sensitive sub-component(s) and that controls the configuring of the secure properties of the security-sensitive sub-component(s). FIG. 5A illustrates a generic case according to such an example.

FIG. 5A illustrates an example in which a hardware component 200 comprises a sub-component or set of sub-components 110 having a number (one, two, more than two) of properties whose configuration needs to be made secure, and a sub-component or set of sub-components 120; the configuration of the sub-component(s) 120 is not sensitive from a security standpoint. In the example illustrated in FIG. 5A the normal use sub-component(s) 120 has (have) a property that is not security-sensitive but which may be configured.

As shown in FIG. 5A, the workload/operating system 55 of an application executing in the non-secure domain uses the API 60 to send requests to the configuration-service application 30 that involve making a change (or changes) in a secure property of the sub-component(s) 110. Responsive to the configuration-service application 30 determining that it is permissible to configure the secured property in the required manner, the configuration-service application 30 transmits a configuration instruction to a controller 130. However, in this example the workload/OS 55 has the capability to instruct configuration-change directly for the normal use sub-component(s) 120 of the hardware component 200 (because there are no security implications if the non-secure domain changes the configuration of properties of this (these) sub-component(s) 120). So, the workload/OS 55 may request the controller 130 to change the configuration of the normal use sub-component 120 properties. In addition, the workload/OS 55 may make use of the normal use sub-component 120.

Figure 5B:
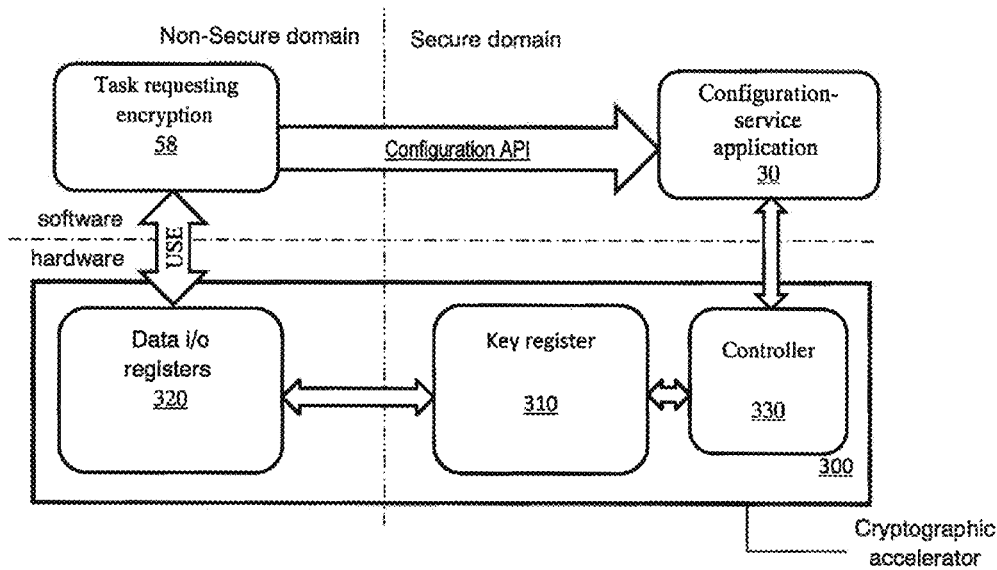
FIG. 5B is a diagram illustrating an example of transactions between components in a data processing system during another example process of making a change in the configuration of a hardware component.

FIG. 5B shows a specific implementation of the approach illustrated in FIG. 5A. In is the example of FIG. 5B, the protected hardware component is a cryptographic accelerator 300, and the sensitive portion of the cryptographic accelerator 300 is the key register 310 whose contents must be kept confidential. However, the as yet-unencrypted data in the data input register and the encrypted data in the data output register are not security-sensitive. In this example, the data input/output registers 320 do not have any properties (sensitive or not) that are available to be configured. In this example the cryptographic accelerator 300 may provide encryption and decryption for the non-secure domain and so a non-secure domain task 58 requesting encryption may access the data input/output registers 320. However, properties of the key register 310 may only be configured via a controller 330.

A technical advantage arises in the case where a hardware component may be instantiated in a way that separates security-sensitive sub-components from sub-components whose configuration does not need special protection, as illustrated in FIGS. 5A and 5B. By virtue of this separation, it may be possible for the non-secure domain to make changes in non-sensitive properties of the hardware component directly, without the need to involve the secure application.

In data processing systems according to the present disclosure, there are various different ways in which the non-secure domain applications may be made aware of the existence of the configuration service offered by the configuration-service application 30. Some example techniques include: using ACPI tables (Advanced Configuration and Power Interface tables), explicit programming of the non-secure domain operating system, and so on. Another example technique consists in designing the non-secure domain operating system to implement a service discovery procedure by issuing a query for discovering the secure configuration-service application and its associate API.

The problem of unintended damage to data processing systems due to changes in hardware configuration in a connected system is liable to be a particular problem in data centers where plural data processing systems are connected to one another. Thus, data centers are specific environments where it is advantageous to use data-processing systems and methods according to examples of the present disclosure.

An example of a data center according to the present disclosure includes plural processing nodes (for example plural interconnected processor devices) and the plural processing nodes include a processing node (supporting a secure domain and a non-secure domain) which includes a processor device having operating modes in the secure domain and non-secure domain that executes a secure application in the secure domain. This processor node comprises a hardware element with a property that has a secure state, and this said property in the secure state may only be reconfigured in response to instructions received from the secure domain. The secure application is operative to implement a configuration service to configure the property of the hardware component in the secure state, responsive to a request received from the non-secure domain according to an application programming interface associated with the secure application.

The above description presents certain examples according to the present disclosure, in which security-sensitive properties of a hardware component in a data processing system are protected against undesirable changes by using a secure application that executes in a secure domain. This approach has specific technical advantages compared to the above-mentioned technique based on use of an SMM mode in x86 family architectures. The "costs" of protecting the hardware component's configuration using the secure application executing in a secure domain are significantly lower than the "costs" involved in switching to and from SMM mode in an x86 family architecture. For example, it is not necessary to suspend execution of all other tasks while a secure application executing in a secure domain processes configuration-change requests; plural secure applications may execute in the secure domain at the same time.

Although the present disclosure has been presented in terms of certain specific examples it is to be understood that various modifications and extensions may be made in the examples without departing from the scope of the appended claims.

For instance, although the above examples use Trust-Zone® bus fabric and security extensions to support and instantiate the secure and non-secure domains, other approaches may be used.

In a similar way, although examples described above refer to use of a single controller to control configuration of a set of secure properties of a hardware component or secure properties of sub-components of a hardware component, the present disclosure is not particularly limited in regard to the number of controllers and the assignment of secure properties to controllers. For example, each secure property may have its own controller, plural secure properties may be configured via a single controller, secure properties of different sub-components of a same hardware component may have separate controllers or a shared controller or a mix of the two approaches, and so on.

The foregoing disclosure describes a number of examples embodiments for protecting hardware. The disclosed examples may include systems, devices, computer-readable storage media, and methods for protecting hardware. For purposes of explanation, certain examples are described with reference to the components illustrated in FIGS. 1-5B. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A data processing system supporting a secure domain and a non-secure domain, the system comprising: a processor device having operating modes in the secure domain and non-secure domain, the processor device to execute a secure application in the secure domain, and a hardware component with a property, said property having a secure state, wherein said property in the secure state can only be reconfigured responsive to instructions received from the secure domain, wherein said secure application is operative to implement a configuration service to configure the property of the hardware component in the secure state, responsive to a request received from the non-secure domain according to an application programming interface associated with the secure application, and wherein the hardware component comprises plural sub-components, the plural sub-components include a first subcomponent and a second sub-component, wherein the first sub-component has said property that can only be reconfigured responsive to instructions received from the secure domain and the second sub-component does not have a property that can only be reconfigured responsive to instructions received from the secure domain; wherein the hardware component has a set of configuration options and the application programming interface exposes only a subset of the configuration options of the hardware component to applications in the non-secure domain.

2. A system according to claim 1, that supports a secure domain and a non-secure domain instantiated using domain-aware bus fabric and security extensions.

3. A system according to claim 1, wherein said secure application is a trusted application and either: the only applications the processor device executes in the secure domain are trusted applications, or the processor device implements a restricted operating system environment, and any untrusted applications the processor executes in the secure domain are sandboxed in the restricted operating system environment.

4. A system according to claim 1, wherein the secure application implemented by the processor device is operative to set said property of the hardware component to the secure state at selected times.

5. A system according to claim 4, wherein the secure application is operative to set said property of the hardware component to the secure state responsive to a determination that a threat condition exists.

6. A system according to claim 1, wherein the processor device implements an operating system in the non-secure domain, and said operating system issues a query that discovers the configuration service offered by said secure application and detects the associated application programming interface.

7. A method of securing a hardware component of a data processing system, the data processing system supporting a secure domain and a non-secure domain and comprising a processor device having operating modes in the secure domain and non-secure domain, the hardware component having a property, said property having a secure state, wherein said property in the secure state can only be reconfigured from the secure domain, the method comprising: causing the processor device of the data processing system to execute a secure application in the secure domain, wherein said secure application is operative to implement a configuration service to configure the property of the hardware component in the secure state, responsive to a request received from the non-secure domain according to an application programming interface associated with the secure application, and wherein the hardware component comprises plural sub-components, the plural sub-components include a first sub-component and a second sub-component, wherein the first sub-component has said property that can only be reconfigured responsive to instructions received from the secure domain and the second sub-component does not have a property that can only be reconfigured responsive to instructions received from the secure domain; wherein the hardware component has a set of configuration options and the application programming interface exposes only a subset of the configuration options of the hardware component to applications in the non-secure domain.

8. The method of securing a hardware component according to claim 7, wherein said secure application is a trusted application and either: the only applications the processor device executes in the secure domain are trusted applications, or the processor device implements a restricted operating system environment and sandboxes untrusted applications in the restricted operating system environment.

9. The method of securing a hardware component according to claim 7, and comprising: causing the processor device to implement an operating system in the non-secure domain, and said operating system issuing a query that discovers the configuration service offered by said secure application and detects the associated application programming interface.

10. A data center comprising plural processing nodes, wherein the plural processing nodes include a processing node supporting a secure domain and a non-secure domain and system comprising: a processor device having operating modes in the secure domain and non-secure domain, the processor device to execute a secure application in the secure domain, and a hardware component with a property, said property having a secure state, wherein said property in the secure state can only be reconfigured responsive to instructions received from the secure domain, wherein said secure application is operative to implement a configuration service to configure the property of the hardware component in the secure state, responsive to a request received from the non-secure domain according to an application programming interface associated with the secure application, and wherein the hardware component comprises plural sub-components, the plural sub-components include a first sub-component and a second sub-component, wherein the first sub-component has said property that can only be reconfigured responsive to instructions received from the secure domain and the second sub-component does not have a property that can only be reconfigured responsive, to instructions received from the secure domain; wherein the hardware component has a set of configuration options and the application programming interface exposes only a subset of the configuration options of the hardware component to applications in the non-secure domain.

* * * * *